(12) United States Patent
Lee et al.

(10) Patent No.: US 8,751,835 B2
(45) Date of Patent: Jun. 10, 2014

(54) COMPUTER SYSTEM AND CONTROL METHOD THEREOF

(75) Inventors: Hae-ho Lee, Suwon-si (KR); Ja-goun Koo, Seoul (KR); Kang-seok Cho, Suwon-si (KR); Cha-hoon Park, Seoul (KR); Man-hee Lee, Hwaseong-si (KR); Jong-in Hwang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 336 days.

(21) Appl. No.: 13/179,687

(22) Filed: Jul. 11, 2011

(65) Prior Publication Data

US 2012/0042185 A1 Feb. 16, 2012

(30) Foreign Application Priority Data

Aug. 10, 2010 (KR) ........................ 10-2010-0076994

(51) Int. Cl.
*G06F 1/00* (2006.01)
(52) U.S. Cl.
USPC ........................................................ 713/300
(58) Field of Classification Search
USPC ........................................................ 713/300
See application file for complete search history.

(56) References Cited

U.S. PATENT DOCUMENTS 7,737,657 B2 * 6/2010 Fischer et al. ................ 320/111
8,055,919 B2 * 11/2011 Magnusson ................... 713/300
8,473,758 B2 * 6/2013 Hoffer et al. .................. 713/300
2006/0069841 A1 * 3/2006 Qin et al. ...................... 710/313
2008/0270809 A1 * 10/2008 Hoffer et al. .................. 713/300

OTHER PUBLICATIONS

Pericom Announces USB Sleep-and-Charge Soltion for Notebook and Mobile Device Chargers, Sep. 21, 2009, http://www.pericom.com/company/news/press-releases/2009/pericom-announces-usb-sleep-and-charge-solution-for-notebook-and-mobile-device-chargers/.*
PI5USB56: USB Sleep and Charge Switch for Single USB Port with Automatic Switching, Jul. 27, 2009, PERICOM.*
Battery Charging Specification Rev. 1.1, Apr. 15, 2009, pp. 1-44.*

* cited by examiner

*Primary Examiner* — Mark Connolly
(74) *Attorney, Agent, or Firm* — Stanzione & Kim, LLP

(57) ABSTRACT

A computer system includes a system part, a connector to which an external device is connected, a communication unit which performs communication with the external device, and a control unit which is connected between the connector and the communication unit to monitor a state of a predetermined recognition signal applied from the external device when the system part is in a standby mode. The control unit performs a predetermined function corresponding to the monitored state of the recognition signal. When the system part is in the standby mode, the system part may be switched to an operation mode based on the recognition signal from the external device. Additionally, a predetermined charging power is output to an external device in response to the predetermined recognition signal applied from the external device connected to the connector while the system part exists in the standby mode.

35 Claims, 8 Drawing Sheets

(A)

(B)

(C)

COMPUTER SYSTEM AND CONTROL METHOD THEREOF

CROSS-REFERENCE TO RELATED APPLICATIONS

This application claims priority under 35 U.S.C. §119(a) from Korean Patent Application No. 10-2010-0076994, filed on Aug. 10, 2010 in the Korean Intellectual Property Office, the disclosure of which is incorporated herein by reference.

BACKGROUND

1. Field of the Invention

The present general inventive concept relates to a computer system and a control method thereof, and more particularly, to a computer system which performs predetermined functions in response to connection of an external device if a system part enters a standby mode.

2. Description of the Related Art

In general, when a mobile device including a battery to be charged during is connected to a computer system operating in an operating system state (OS) state or in a DOS state, the battery may be charged. However, the battery may not be charged in a standby mode of the computer system even when the mobile device is connected to the system.

In addition, the computer system is disallowed to wake-up using a mouse or a keyboard in the standby mode of the computer system.

SUMMARY

Accordingly, one or more exemplary embodiments provide a computer system which is capable of determining a state of a predetermined recognition signal applied from an external device connected to a system part which enters a standby mode and waking up the system part or supplying charging power to the external device based on a result of the determination.

Additional features and utilities of the present general inventive concept will be set forth in part in the description which follows and, in part, will be obvious from the description, or may be learned by practice of the present general inventive concept.

The foregoing and/or other features may be achieved by providing a computer system including a system part; a connector to which an external device is connected, a communication unit which performs communication with the external device, and a control unit which is connected between the connector and the communication unit to monitor a state of a predetermined recognition signal applied from the external device when the system part is in a standby mode, and performs a predetermined function corresponding to the monitored state of the recognition signal.

The control unit may check whether the recognition signal is a pulse signal having a pulse voltage value of a predetermined period or a constant signal having a predetermined constant voltage value.

If it is determined that the recognition signal is the pulse signal having the pulse voltage value of the predetermined period, the control unit may determine the external device as a user external device which can input a selection from a user and control the communication unit to perform data communication with the external device.

The control unit may wake up the system part in the standby mode when the external device is determined as the user external device which can input the selection from the user.

The user external device which can input the selection from the user may include a pointing device unit or a keyboard.

If it is determined that the recognition signal is the constant signal having the constant predetermined voltage value, the control unit may determine the external device as a battery external device containing a chargeable battery and transmit a predetermined response signal to initiate of charging of the battery in response to the recognition signal to the external device.

The computer system may further include a power supply unit, and, when the external device is determined as the battery external device containing the chargeable battery, the control unit may control the power supply unit to supply predetermined charging power to charge the battery to the external device through the connector.

The computer system may further include a switching unit which selectively connects the connector to one of the communication unit and the control unit, and the control unit may control the switching unit to electrically connect the connector to the control unit when the system part is in the standby mode.

If it is determined that the recognition signal is the pulse signal having the pulse voltage value of the predetermined period, the control unit may control the switching unit to electrically connect the connector to the communication unit.

If it is determined that the recognition signal is the constant signal having the constant predetermined voltage value, the control unit may control the switching unit to electrically connect the connector to the control unit.

The switching unit may further include an output signal circuit which outputs an output signal having a predetermined voltage value in response to the recognition signal.

The output signal circuit may include one of a ground circuit, a pull-down circuit and a resistive voltage divider circuit.

The connector may include a universal serial bus (USB) interface.

The foregoing and/or other features may be achieved by providing a control method of a computer system, including placing a system part into a standby mode, monitoring a state of a predetermined recognition signal applied from an external device by means of a control unit which is connected between a connector to which the external device is connected and a communication unit which communicates with the external device, and performing a predetermined function corresponding to the monitored state of the recognition signal.

The monitoring may include determining whether the recognition signal is a pulse signal having a pulse voltage value of a predetermined period or a constant signal having a constant predetermined voltage value.

If it is determined in the monitoring that the recognition signal is the pulse signal having the pulse voltage value of the predetermined period, the performing a predetermined function may include determining the external device as a user external device which can input a selection from a user and controlling the communication unit to perform data communication with the external device.

The performing a predetermined function may include waking up the system part in the standby mode when the external device is determined as the user external device which can input the selection from the user.

The user external device which can input the selection from the user may include a pointing device unit or a keyboard.

If it is determined in the monitoring that the recognition signal is the constant signal having the constant predetermined voltage value, the performing a predetermined function may include determining the external device as a battery external device containing a chargeable battery and transmitting a predetermined response signal to initiate charging of the battery in response to the recognition signal to the external device.

When the external device is determined as the battery external device containing the chargeable battery, the performing a predetermined function may include controlling a power supply unit to supply predetermined charging power to charge the battery to the external device through the connector.

The computer system may further include a switching unit which selectively connects the connector to one of the communication unit and the control unit, and the control method may further include controlling the switching unit to electrically connect the connector to the control unit by means of the control unit when the system part is in the standby mode.

If it is determined in the monitoring that the recognition signal is the pulse signal having the pulse voltage value of the predetermined period, the controlling the switching unit may include controlling the switching unit to electrically connect the connector to the communication unit.

If it is checked in the monitoring that the recognition signal is the constant signal having the constant predetermined voltage value, the controlling the switching unit may include controlling the switching unit to electrically connect the connector to the control unit.

The switching unit may further include an output signal circuit which outputs an output signal having a predetermined voltage value in response to the recognition signal.

The output signal circuit may include one of a ground circuit, a pull-down circuit and a resistive voltage divider circuit.

The connector may include a universal serial bus (USB) interface.

As described above, one or more exemplary embodiments provide a computer system with increased user's convenience, which is capable of determining a state of a predetermined recognition signal applied from an external device connected to a system part which enters a standby mode and waking up the system part or supplying charging power to the external device based on a result of the determination.

Another feature of the general inventive concept includes a computer system including a communication interface to receive an external device and including a system part operable in an operation mode and a standby mode, comprising a communication unit electrically connected to the communication interface to communicate with the external device, and a control unit in electrical communication with the system part and the communication unit to detect the standby mode of the system part and to detect a recognition signal output by the external device and to perform at least one operation with the external device based on the recognition signal while the system part exists in the standby mode.

BRIEF DESCRIPTION OF THE DRAWINGS

The above and/or other features of the present general inventive concept will become apparent and more readily appreciated from the following description of the exemplary embodiments, taken in conjunction with the accompanying drawings, in which.

DETAILED DESCRIPTION OF THE EMBODIMENTS

Figure 1:
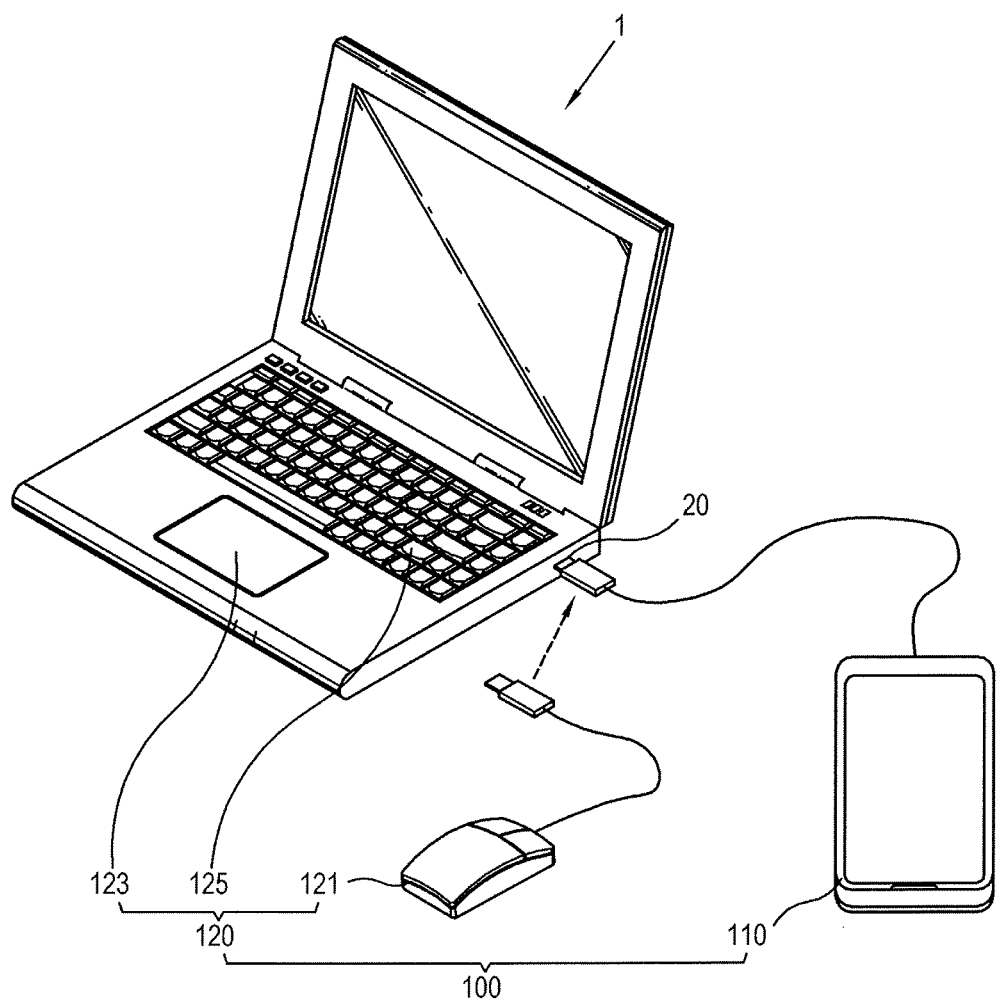
FIG. 1 is a schematic view of a computer system and an external device according to one exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a schematic view of a computer system 1 and an external device 100 according to an exemplary embodiment of the present general inventive concept.

The computer system 1 of this present general inventive concept may be implemented by a personal computer (PC) such as a desktop computer or a laptop computer. Further, in addition to typical types of PCs, the computer system according to one exemplary embodiment of the present general inventive concept may include, but is not limited to, any other types of apparatuses having functions equivalent to those of PCs, such as a smart book, a mobile Internet Device (MID), a net book, a tablet PC or the like.

In one exemplary embodiment, the computer system 1 may generally include a central processing unit (CPU), a main memory, a memory controller hub (MCH), I/O controller hub (ICH), a graphics controller, a display unit and peripheral devices. The CPU controls the entire operation of the computer system 1 and executes computer programs loaded in the main memory. The CPU may perform communication with and control the MCH and the ICH in executing these computer programs. The main memory temporarily stores these computer programs executed by the CPU and data pertaining to performance of the CPU. The main memory may be implemented by a nonvolatile memory such as a double-data-rate synchronous dynamic random access memory (DDR SDRAM) or the like. The graphics controller processes graphic data of pictures displayed on the display unit. The peripheral devices may be various types of hardware, including, but is not limited to, a hard disk drive, a flash memory, a CD-ROM, a DVD-ROM, a USB drive, a Bluetooth adapter, a modem, a network adapter, a sound card, a speaker, a microphone, a tablet, a touch screen and so on. The MCH interfaces data reading and writing between the main memory and other components such as the CPU. The ICH interfaces communication between the CPU and the peripheral devices. In this embodiment, the computer programs executed by the CPU may include a basic input/output system (BIOS), an operating system (OS) and various applications. In this embodiment, the BIOS may be stored in a BIOS ROM (not shown) which is a nonvolatile memory, and the OS and the applications may be stored in the hard disk drive, for example.

The external device 100 may include a portable device 110, or a battery external device, containing a chargeable battery and user peripheral devices 120, or user external devices, which can input a selection from a user. The portable device 110 and the user peripheral devices 120 may be connected to a connector 20.

The portable device 110 may include any types of devices containing a chargeable battery, including a mobile phone, a smart phone, a MP3 player, a PDA, a PMP and the like. The portable device 110 is driven with power produced by a built-in chargeable battery such as, for example, a lithium ion battery. In addition, the chargeable battery may be charged with power from a commercial power supply using, for example, a dedicated AC adapter of the portable device 110.

The user peripheral devices 120 which can input a selection from a user may include pointing devices including a mouse 121 and a touch pad 123, and a keyboard 125. The touch pad 123 may be provided in the keyboard 125 or may be separately provided and connected to the computer system 1 through the connector 20. The user peripheral devices 120 which can input the user's selection may be connected to the computer system 1 by wireless or via a cable through the connector 20.

The portable device 110 or the user peripheral devices 120 which can input the user's selection may be selectively connected to the computer system 1 through the connector 20.

Figure 2:
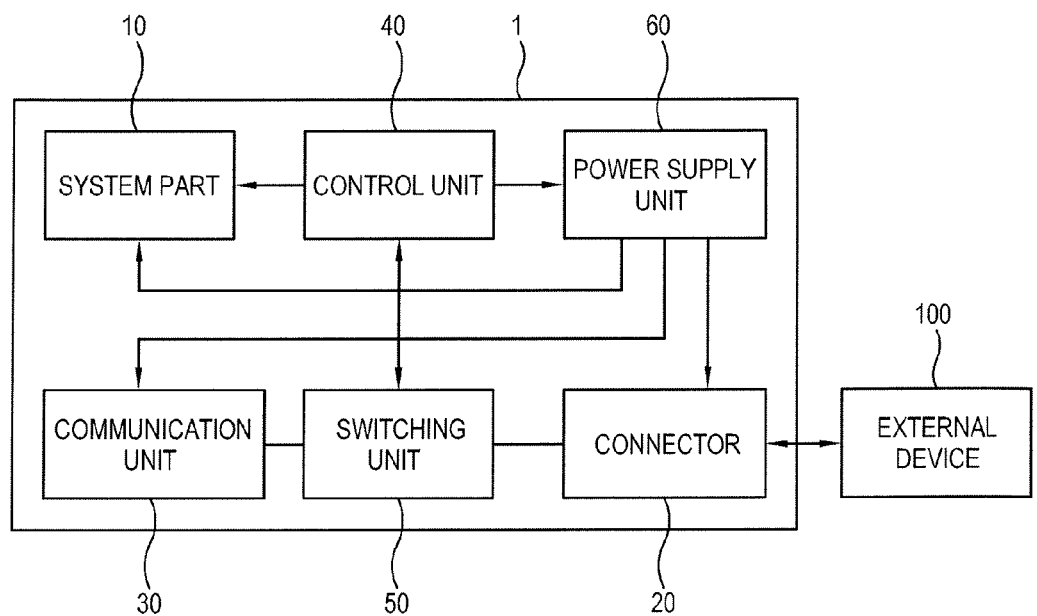
FIG. 2 is a control block diagram of the computer system shown in FIG. 1.

FIG. 2 is a control block diagram of the computer system 1 shown in FIG. 1.

Referring to FIG. 2, the computer system 1 according to one exemplary embodiment of the present general inventive concept includes a system part 10, a connector 20, a communication unit 30, a control unit 40, a switching unit 50 and a power supply unit 60.

The system part 10 may selectively operate in an operation mode and a standby mode in response to a mode selection signal output by the control unit 40. Generally, the computer system 1, including the system part 10, initially operates in the operation mode upon start-up, i.e. booting, the computer system 1. While operating in the operation mode, the system part 10 may operate in response to various functions which can be provided to a user by the computer system 1. For example, the system part 1 may output one or more control and/or power signals in response to input commands from a user. Thus, the system part 10 may be configured to include the CPU, the main memory, the MCH, the ICH, the graphic controller, the display unit and the peripheral devices, as shown in FIG. 1, to perform the operation related to the functions. The system part 10 is supplied with operating power from the power supply unit 60 or a battery unit (not shown).

Alternatively, the computer system 1 may designate the system part 10 to switch from the operation mode to the standby mode to reduce power consumption by shutting off power to be supplied to one or more components constituting the computer system 1 step by step. For example, the control unit 40 may detect the activity and/or inactivity of a user using the computer system. Accordingly, the control unit may detect the inactivity of a user over a predetermined time period and may output a standby mode selection signal to initiate the standby mode of the system part 10. In response to receiving the standby mode selection signal, the system part 10 may switch from the operation mode to the standby mode by selectively shutting off power to one or more components that utilize battery power. Therefore, battery power of the computer system 1 may be conserved.

Figure 3:
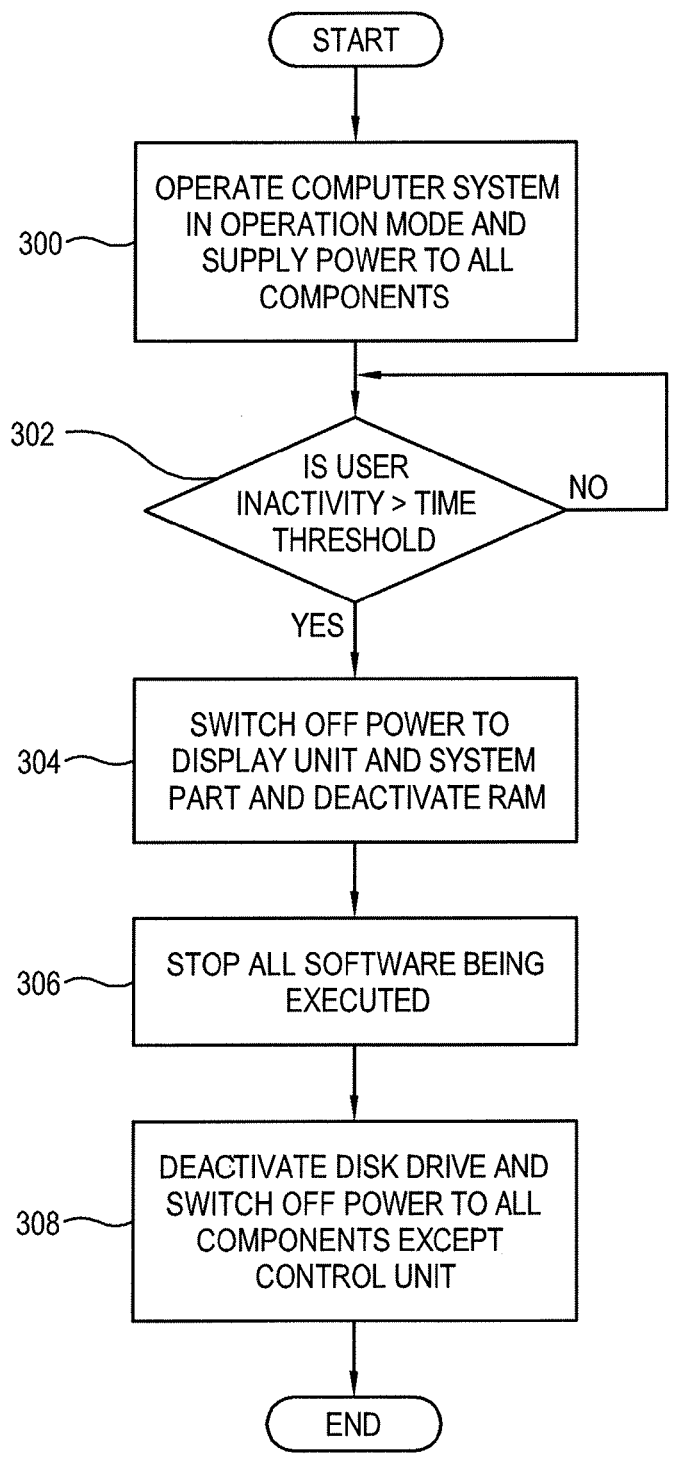
FIG. 3 is a flowchart illustrating a method of switching a computer system 1 from an operation mode into a standby mode according to an exemplary embodiment of the general inventive concept.

Referring now to FIG. 3, a flowchart illustrates an exemplary method of initiating a standby mode to reduce power consumption of a computer system 1.

At operation 300 the computer system 1 exists in the operation mode and power is supplied to all components of the computer system 1. During the operation mode, an operating system (OS), for example a Windows or DOS operating system of the computer system is driven and may respond to input commands. The input commands may be input by a user manipulating the computer system 1 using one or more peripheral devices 120, including but not limited to, a keyboard and/or a mouse. Alternatively, the computer system 1 may be connected to a network (not shown) and may receive input commands from one or more remotely located devices (not shown).

At operation 302, the control unit 40 determines whether a time of user inactivity has exceeded a predetermined time. If the time of user inactivity exceeds the predetermined time, the control unit 40 outputs the standby mode selection signal to the system part 10, and the method proceeds to operation 304. Otherwise, the method returns to operation 302.

At operation 304, power to the display unit (not shown) and the system part 10 of the computer system 1 may be shut off (except for a real time clock of the system part). In addition, Random Access Memory (RAM) may be deactivated and programs currently executed in the system part may be stored in a memory.

At operation 306, software under execution is stopped the method proceeds to operation 308. At operation 308, a disk drive of the computer system 1 is deactivated and power to all components of the computer system may be shut off, except power to the control unit 40 may still be delivered.

In at least one exemplary embodiment, operations 304, 306 and 308 may each include shutting of power to the display unit (not shown) and the system part 10, except for a real time clock of the system part, and may be individually initiated. That is, entrance of the system part 10 into a standby mode may include the system part 10 transitioning from operation 302 into any one of operations 304-306.

Referring again to FIG. 2, the external device 100 is connected to the connector 20, and may perform data communication with the system part 10. If the external device 100 is a portable device containing a chargeable battery, the battery may be charged through connector 20.

The connector 20 may be implemented using various data communication interfaces, including but not limited to, a universal serial bus (USB) interface. Hereinafter, the connector will be described as a USB, for exemplary purposes. The connector 20 may include a ground terminal (GND), a power supply terminal (PWR) and data communication terminals (D+/−). Accordingly, the external device 100 may be supplied with charging power through the power supply terminal and may perform data communication with the computer system 1 through the data communication terminals (D+/−).

The connector 20 may be supplied with driving power from the power supply unit 60 even when the system part 10 enters the standby mode.

The communication unit 30 may perform communication with the external device 100 connected through the connector 20 when receiving power.

The power supply 60 may selectively supply power to various components of the computer system. The power supply 60 may include, but is not limited to, an analog power supply and/or a digital power supply. In at least one exemplary embodiment, the power supply 60 is connected to each of the system part 10, the connector 20, the communication unit 30 and the controller unit 40. Moreover, the controller unit 40 may control one or more outputs of the power supply 60, as discussed in greater detail below.

If the connector 20 is implemented by the USB interface, the communication unit 30 may be implemented by a USB host controller. The USB host controller is electrically connected to the data communication terminals (D+/−) and thus may execute a series of processes to communicate data with the external device 100 connected to the connector 20.

When the system part 10 is in the standby mode, the control unit 40 is connected between the connector 20 and the communication unit 30 and may monitor a state of a predetermined recognition signal output from the external device 100 and perform a particular function corresponding to the monitored state of the recognition signal.

In this exemplary embodiment, the control unit 40 may include, but is not limited to, an embedded controller and the central processing unit (CPU) shown in FIG. 1.

If the control unit 40 is implemented by the embedded controller, the CPU included in the computer system 1 may entirely control the system part 10, while the embedded controller may control input/output devices including the connector 20, the communication unit 30 and so on and control supply of power to various devices.

When the system part 10 enters the standby mode, power to the system part 10 is shut off and, accordingly, power to the CPU is shut off. However, the embedded controller is designed to prevent power to the embedded controller from being shut off even when the system part 10 enters a standby mode, according to any of operations 304-308 described above. Accordingly, even under the standby mode of the system part 10, the embedded controller may always monitor the state of the predetermined recognition signal applied from the external device 100 connected through the connector 20.

Accordingly, in response to the monitored state of the recognition signal, the control unit 40 may control the communication unit 30 to perform data communication with the external device 100 connected through the connector 20, and may wake-up the system part 10 existing in the standby mode, and initiate the operation mode. That is, in response to detecting the recognition signal output by the external device 100, the control unit 40 may output the operation mode selection signal to system part 10. In response to receiving the operation mode selection signal, the system part 10 may switch from standby mode into the operation mode.

In addition, in response to the monitored state of the recognition signal, the control unit 40 may control the power supply unit 60 (or a battery unit not shown) to supply charging power to the external device 100 through the connector 20.

To switch the system part 10 from the standby mode to the operation mode, and vice versa, the switching unit 50 may be provided to selectively connect the connector 20 to one of the communication unit 30 and the control unit 40. The switching unit 50 may include, but is not limited to, an analog switch. For exemplary purposes, the switching unit 50 will be described as an analog switch.

The switching unit 50 may further include an output signal circuit which outputs an output signal having a predetermined voltage value in response to the monitored state of the recognition signal. The output signal circuit may include one of a ground circuit, a pull-down circuit and a resistive voltage divider circuit.

Operation of the control unit 40 and switching unit 50 will be described in more detail later with reference to FIGS. 2 and 3.

The power supply unit 60 may supply power to each of devices in the computer system 1. The power supply unit 60 may convert external commercial AC power into power suitable for each of devices in the computer system 1.

When the system part 10 enters the standby mode, the power supply unit 60 may supply power to the connector 20 under control of the control unit 40. In addition, charging power may be supplied to the external device 100 connected to the connector 20 under control of the control unit.

The battery unit (not shown) has a battery capacity to charge supplied power, and in particular, supplied power from the power supply unit 60. The battery unit (not shown) is a secondary power supply to assist the power supply unit 60 and may supply power to each component of the computer system 1.

When the system part 10 enters the standby mode, the battery unit (not shown) may supply power to the connector 20 under control of the control unit 40. In addition, charging power may be supplied to the external device 100 connected to the connector 20.

The power supply unit 60 and the battery unit (not shown) may selectively supply power to each component of the computer system 1 under control of the control unit 40. For example, the control unit 40 may control the power supply unit 60 to supply power if an external commercial AC power is input. Alternatively, the control unit 40 may control the battery unit (not shown) to supply power if the external commercial AC power is not input.

FIGS. 3A to 3C illustrate an example of monitoring of a state of a predetermined recognition signal of the external device by the control unit 40 of the computer system 1 according to an exemplary embodiment of the present general inventive concept.

Figure 4:
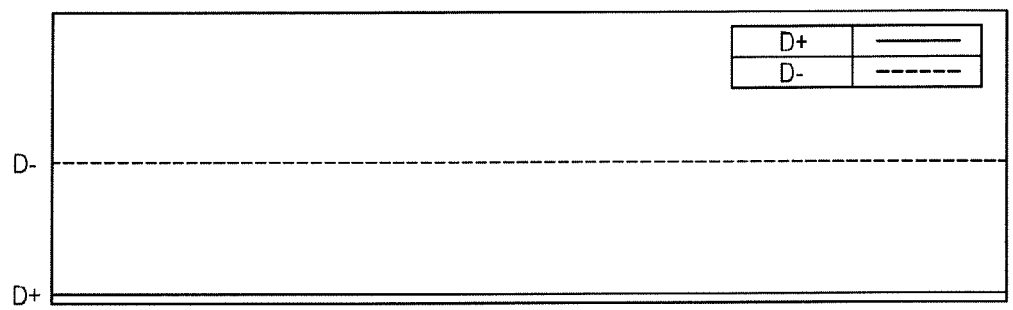
FIGS. 4A to 4C show an example of monitoring of a state of a predetermined recognition signal of an external device by a control unit 40 of a computer system 1 according to one exemplary embodiment of the present general inventive concept.
Figure 4:
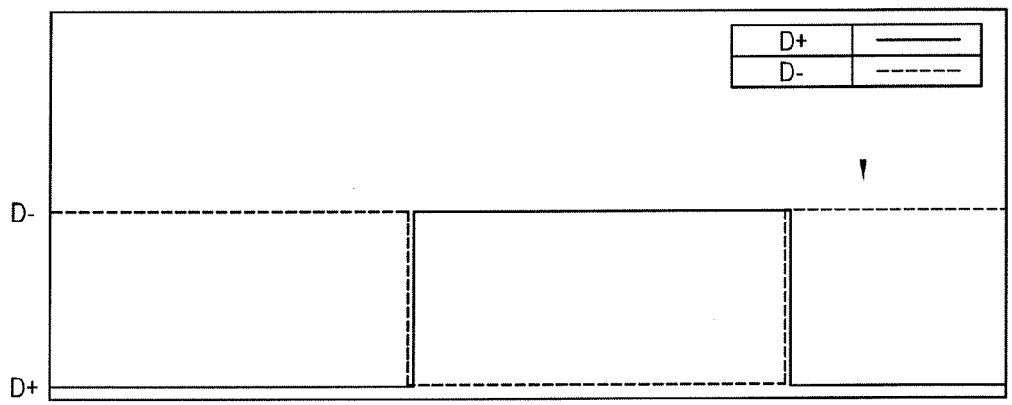
Figure 4:
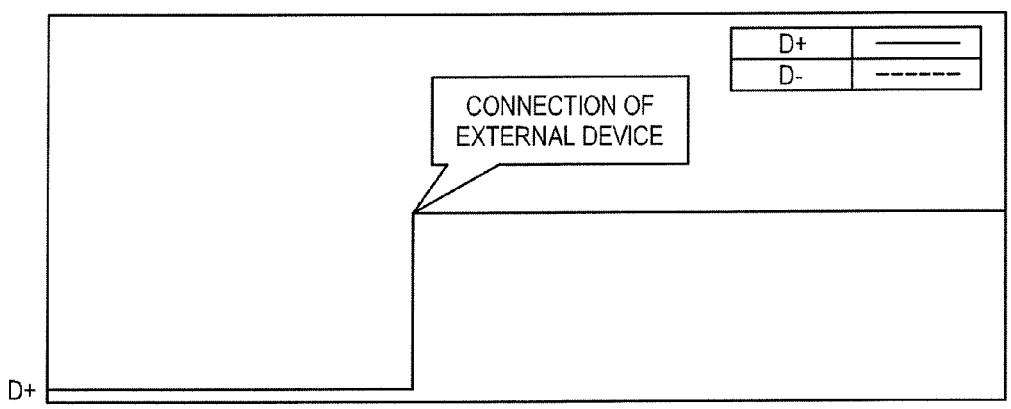

FIG. 4A shows a state of the connector 20 while the system part 10 of the computer system 1 exists in the standby mode and no external device 100 is connected to the connector 20. As shown, when the system part 10 exists in the standby mode, a D− terminal of the data communication terminals (D+/D−) of the connector 20 remains at logic 'High' while a D+ terminal remains at logic 'Low'.

FIG. 4B shows a state of the connector 20 when the system part 10 receives a recognition signal having a pulse voltage value of a predetermined period from the external device 100 from an external device 100 connected to the connector 20, while the system part 10 exists in the standby mode.

As shown, when the system part 10 receives the recognition signal having the pulse voltage value of the predetermined period from the external device 100, the D− terminal of the connector 20 is changed from logic 'High' to logic 'Low' with a predetermined period (for example, several hundreds milliseconds). When the D− terminal is changed to logic 'Low', the D+ terminal is changed from logic 'High' to logic 'Low'.

Accordingly, when the system part 10 receives the recognition signal having the pulse voltage value of the predetermined period from the external device 100 connected to the connector 20 and the control unit 40 monitors a state of the data communication terminals of the connector 20 as shown in FIG. 4B, the control unit 40 determines the external device 100 connected to the connector 20 as a user peripheral device 120 to input a user's selection. Accordingly, the control unit 40 may control the communication unit 30 to perform data communication with the user peripheral device 120. In addition, the control unit 40 may wake-up the system part 10 in the standby mode, i.e. switch the system part 10 from the standby mode to the operation mode, to perform data communication with the user peripheral device 120.

FIG. 4C shows a state of the connector 20 when the system part 10 receives a recognition signal having a constant predetermined voltage value from the external device 100 while the system part 10 exists in the standby mode.

As shown, when the system part 10 receives the recognition signal having the constant predetermined voltage value from the external device 100, the D− terminal of the connector 20 changes from logic 'High' to, and remains at logic 'Low'. Additionally, the D+ terminal of the connector 20 changes from logic 'Low' to logic 'High', and remains at logic 'High.' Accordingly, when the control unit 40 monitors a state of the data communication terminals of the connector 20 as shown in FIG. 4C, the control unit 40 determines that the external device 100 connected to the connector 20 is a portable device 110 containing a chargeable battery. Accordingly, the control unit 40 may control the power supply unit 60 to supply charging power to the portable device 110 through the connector 20 to charge the battery of the portable device 110.

Figure 5A:
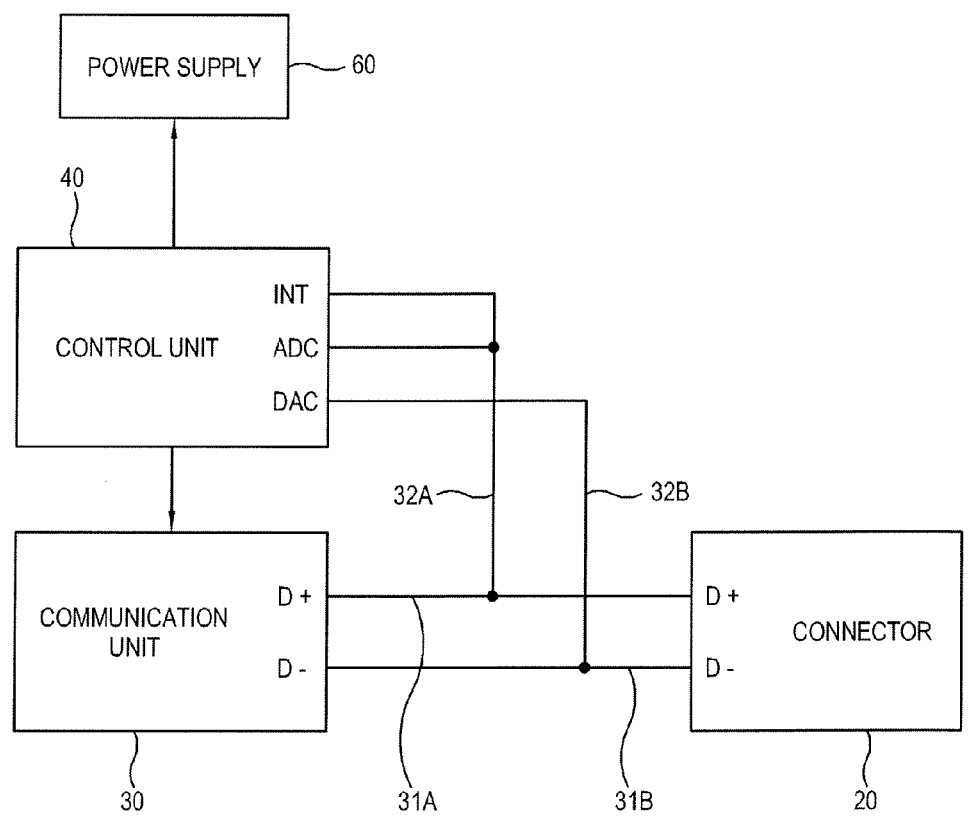
FIGS. 5A and 5B show an example of a control operation of a control unit of the computer system according to one exemplary embodiment of the present general inventive concept.
Figure 5B:
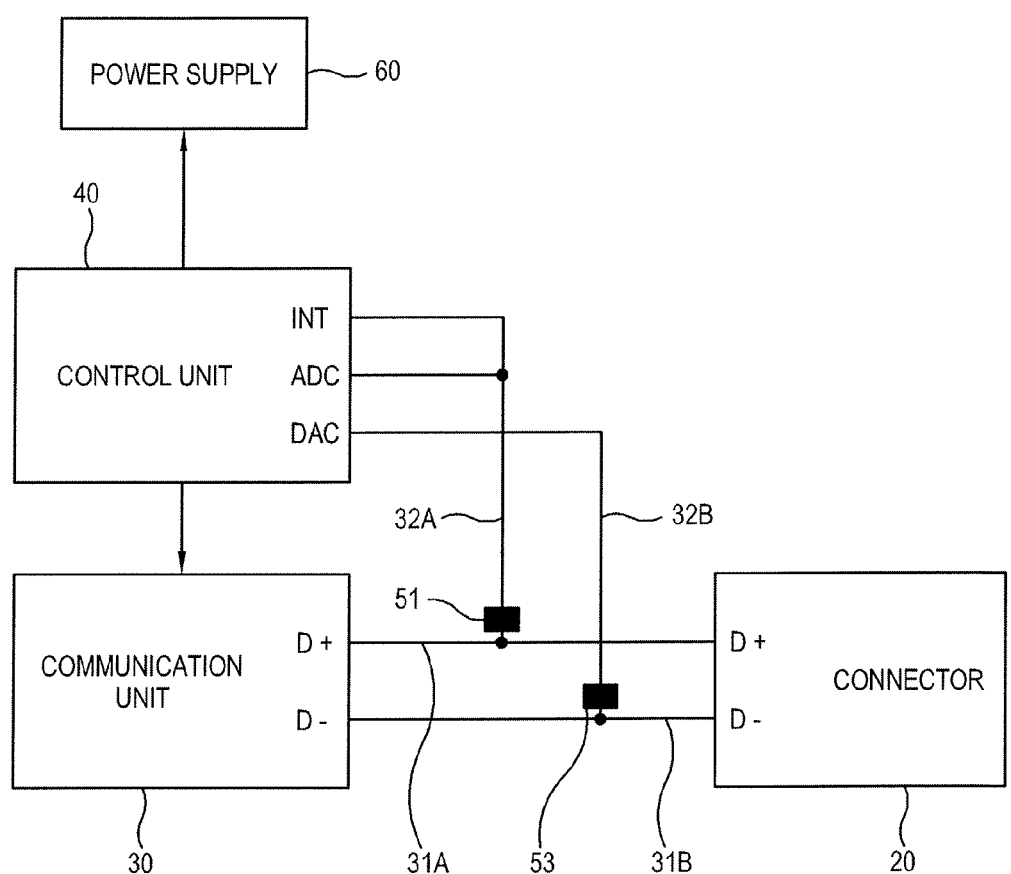

FIGS. 5A and 5B show an example of a control operation of the control unit of the computer system according to one exemplary embodiment of the present general inventive concept.

In this exemplary embodiment, the control unit 40 is connected between the connector 20 and the communication unit 30.

As shown in FIG. 5A, the data communication terminals (D+/D−) of the connector 20 are connected to the communication unit 30 via communication data lines 31A, 31B. In the exemplary embodiment of FIG. 5A, the power supply 60 is connected to the control unit 40. The power supply 60 may include at least one of an analog power supply and a digital power supply. The control unit 40 may further include an analog-to-digital converter (ADC) and a digital-to-analog converter (DAC). In this case, an interrupt (INT) pin and an analog-digital converter (ADC) pin included in the control unit are connected to the D+ data line 31A via a first control line 32A and a digital-analog converter (DAC) pin included in the control unit is connected to the D− data line 31B via a second control line 32B. Accordingly, in one exemplary embodiment, the control unit 40 may convert analog power to digital power and output the digital power via the ADC pin, and may convert digital power to analog power and output the analog power via the DAC pin.

If the system part 10 is operating in an operation mode, the communication unit 30 and the connector 20 are electrically connected via the communication data lines 31A, 31B to communicate data.

When the system part 10 enters the standby mode, supply of power to the communication unit 30 is shut off, but supply of power to the connector 20 and the control unit 40 is not shut off. Accordingly, the control unit 40 may continuously monitor receipt of a recognition signal from the external device 100 connected through the connector 20.

Specifically, since the supply of power to the communication unit 30 is shut off, the recognition signal from the external device 100 through the connector 20 is received in the D+ data line 31A through the D+ terminal of the connector 20 and then is transmitted to the INT pin and ADC pin of the control unit 40 connected to the D+ data line 31A. This allows the control unit 40 to monitor the state of the recognition signal from the external device 100.

As a result of the monitoring by the control unit 40, if it is determined that the recognition signal received from the external device 100 connected through the connector 20 is a pulsed signal having a pulse voltage value of a predetermined period (i.e., in case of the state shown in FIG. 4B), the control unit 40 determines the external device 100 as the user peripheral device 120 which can input a user's selection. Accordingly, the control unit 40 controls the power supply unit 60 to supply power to the communication unit 30 so that the communication unit 30 can perform data communication with the external device 100 through the data communication terminals (D+/D−) of the connector 20. In addition to controlling the power supply unit 60 to supply power to the communication unit 30, the control unit 40 may wake-up the system part 10 from the standby mode, i.e., switch the system part 10 from the standby mode into the operation mode.

Additionally, if it is determined that the recognition signal received from the external device 100 connected through the connector 20 is a constant signal having a constant predetermined voltage value (i.e., in case of the state shown in FIG. 4C), the control unit 40 determines the external device 100 is a portable device 110 containing a chargeable battery and may check a charging mode (for example, a charging voltage value) of the portable device from the monitored constant predetermined voltage value. Accordingly, the control unit 40 transmits a predetermined response signal, which initiates charging of the battery in response to the recognition signal, to the portable device 110 via the D− terminal through the second control line 32B disposed between the DAC pin and the D− data line 31B. As a result, the portable device 110 may be supplied with charging power through the connector 20 to charge the battery of the portable device 110. Alternatively, the control unit 40 may control the power supply unit 60 to supply charging power corresponding to a determined charging mode of the portable device 110 through the second control line 32B disposed between the DAC pin and the D− data line 31B.

FIG. 5B is different from FIG. 5A in that the former further includes one or more switching units 51, 53.

As shown in FIG. 5B, a first analog switch unit 51 is interposed between the first control line 32A in communication with the INT pin/and ADC pin of the control unit 40 and the D+ data line 31A. Additionally, a second analog switch unit 53 is interposed between the second control line 32B in communication with the DAC pin of the control unit 40 and the D− data line 31B.

When the system part 10 is in the operation mode, both of the first and second analog switching units 51 and 53 are switched OFF so that the communication unit 30 can be electrically connected to the connector 20 to communicate data via the data lines 31A, 31B.

In this exemplary embodiment, even when the system part 10 enters the standby mode, supply of power to the communication unit 30 as well as the connector 20 and the control unit 40 may not be shut off.

When the system part 10 enters the standby mode, the first analog switching unit 51 is switched ON and thus the D+ terminal of the connector 20 is electrically connected to the control unit 40. This allows the control unit 40 to monitor a state of a predetermined recognition signal from the external device 100 connected to the connector 20.

As a result of the monitoring by the control unit 40, if it is determined that the recognition signal received from the external device 100 connected through the connector 20 is a pulsed signal having a pulse voltage value of a predetermined period (i.e., in case of the state shown in FIG. 4B), the control unit 40 determines the external device 100 as the user peripheral device 120 which can input a user's selection. Accordingly, the control unit controls the first analog switching unit 51 to be switched OFF so that the communication unit 30 can be electrically connected to the connector 20 to communicate data over the D+ data line 31A. In addition, the control unit 40 may control the power supply 60 to output power to the system part 10 to wake-up the system part 10 from the standby mode, and initiate the operation mode.

Additionally, if it is determined that the recognition signal received from the external device 100 connected through the connector 20 is a constant signal having a constant predetermined voltage value (i.e., in case of the state shown in FIG. 4C), the control unit 40 determines the external device 100 as the portable device 110 containing a chargeable battery and may check a charging mode (for example, a charging voltage value) of the portable device from the monitored constant predetermined voltage value. Accordingly, the control unit 40 controls the second analog switching unit 53 to be switched ON to transmit a predetermined response signal, which initiates charging of the battery in response to the recognition signal, to the portable device 110 via the D− terminal. The portable device 110 which received the response signal is supplied with charging power from the power supply 60 through the connector 20 to charge the battery of the portable device 110. Alternatively, the control unit 40 may control the second analog switching unit 53 to be switched ON to control the power supply unit 60 to supply charging power corresponding to the checked charging mode of the portable device 110 via the D− terminal.

Figure 6:
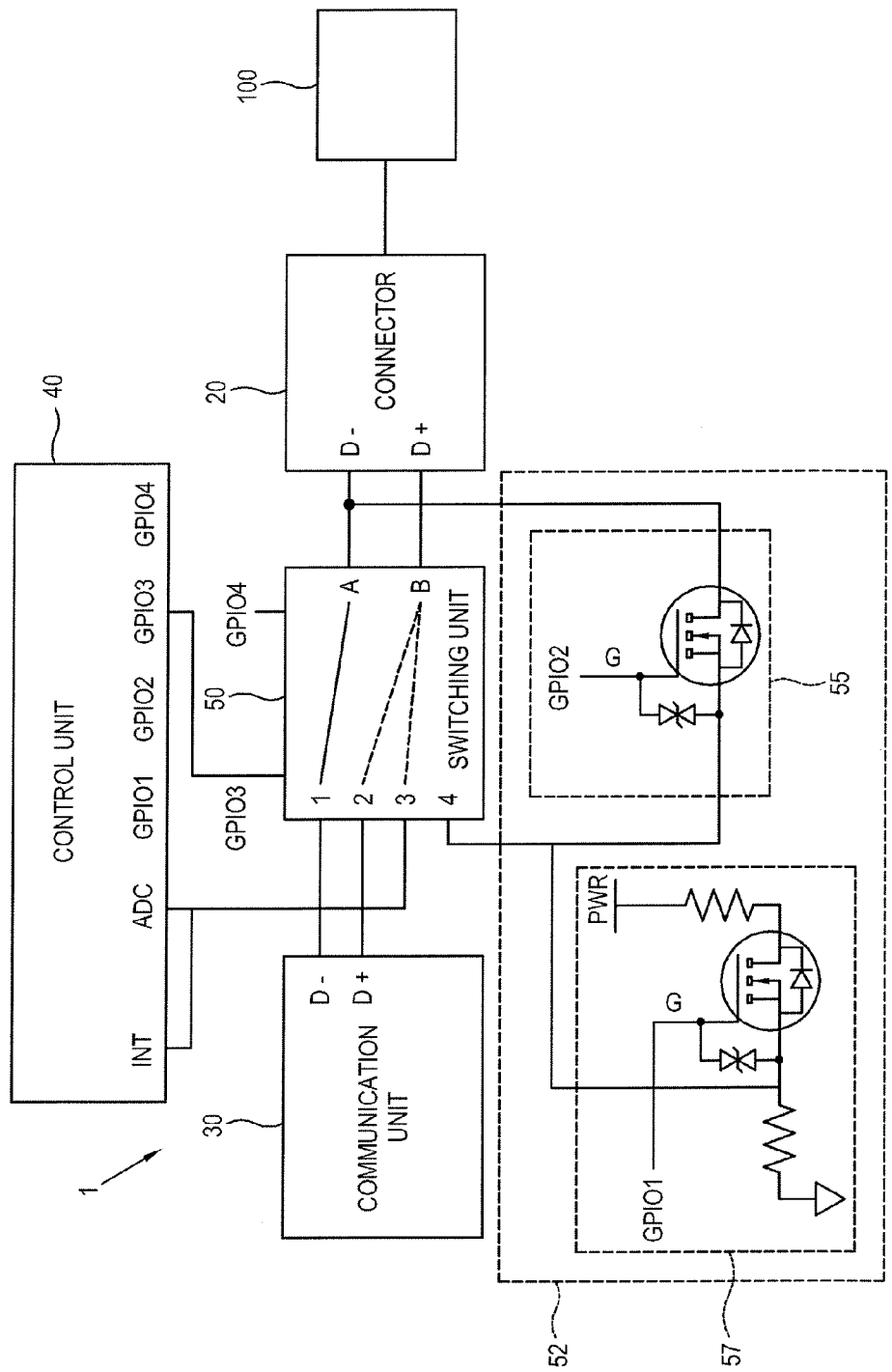
FIG. 6 shows an example of a switching unit of the computer system according to one exemplary embodiment of the present general inventive concept.

Referring now to FIG. 6, a computer system 1 is generally shown, including a connector 20, a communication unit 30, a control unit 40, a switching unit 50 and a second power supply 52.

As illustrated in the exemplary embodiment of FIG. 6, the switching unit 50 selectively connects the connector 20 to one of the communication unit 30 and the control unit 40. The second power supply 52 may generate an output signal that may charge a battery if the external device 100 connected to the connector 20 is a battery operated portable device 110. The second power supply 52 may further include a first output circuit 55 and a second output circuit 57, which are discussed in greater detail below.

The controller may be connected to the switching unit 50 via general input/output pins, for example GPIO3 of the control unit 40 and the switching unit 50. The switching unit 50 includes terminal A that is connected to the D+ terminal of the connector 20; terminal B that is connected to the D− terminal of the connector 20; terminal 1 that is connected to the D+ terminal of the communication unit 30; terminal 2 that is connected to the D− terminal of the communication unit 30; terminal 3 that is connected to the INT pin and ADC pin of the control unit 40; and terminal 4 that outputs a control signal to output signal circuits 55 and 57 which generate a predetermined output signal to the connector 20.

When the system part 10 is in the operation mode, terminal A and terminal B of the switching unit 50 are connected to terminal 1 and terminal 2, respectively, so that the connector 20 can normally perform data communication with the communication unit 30.

When the system part 10 enters the standby mode, the terminal connections of the switching unit 50 are changed. More specifically, terminal A remains connected to terminal 1. However, the controller unit 40 controls the switching unit 50 to connect terminal B to terminal 3. As a result, the communication unit 30 is disconnected from the connector 20, while the control unit 40 is connected to the connector 20. Additionally, a predetermined recognition signal from the external device 100 is output onto the D+ terminal of the connector 20, and is transmitted to the control unit 40 via terminal 3 of the switching unit 50. Accordingly the control unit 40 may monitor a state of the recognition from the external device 100 connected to the connector 20.

As a result of the monitoring by the control unit 40, if it is determined that the recognition signal received from the external device 100 connected through the connector 20 is a pulse signal having a pulse voltage value of a predetermined period (i.e., in case of the state shown in FIG. 4B), the control unit 40 controls the switching unit 50 to connect terminal B from terminal 3 to terminal 2 so that the communication unit 30 can be electrically connected to the connector 20f to communicate data. In addition, the control unit 40 may wake-up the system part 10 from the standby mode, and initiate the operation mode.

Additionally, if it is determined that the recognition signal received from the external device 100 connected through the connector 20 is a constant signal having a constant predetermined voltage value (i.e., in case of the state shown in FIG. 4C), the control unit 40 determines the external device 100 as the portable device 110 containing a chargeable battery, and may check a charging mode (for example, a charging voltage value) of the portable device from the monitored constant predetermined voltage value. Accordingly, the control unit 40 outputs a control signal via terminal 4 that controls the switching unit 50 so that the charging voltage value corresponding to the determined charging mode of the portable device 110 can be output from the output signal circuits 55 and 57. As an output of the output signal circuits 55 and 57 is connected to the D− terminal of the connector 20, the charging voltage value is output through the D− terminal. This allows initiation of charging of the battery in the portable device 110.

The output signal circuits 55 and 57 are circuits which can output the charging voltage value to charge the battery of the portable device 110 connected to the connector 20. The output signal circuits 55 and 57 shown in FIG. 6 are only by way of example and may include any other types of circuits as long as they can output a charging voltage value satisfying Battery Charging Specification Revision 1.1 (Apr. 15, 2009). These output signal circuits may include, but are not limited to, a ground circuit, a pull-down circuit and a resistive voltage divider circuit to output a charging voltage value of the battery in the portable device 110, which satisfies Battery Charging Specification Revision 1.1 (Apr. 15, 2009).

Figure 7:
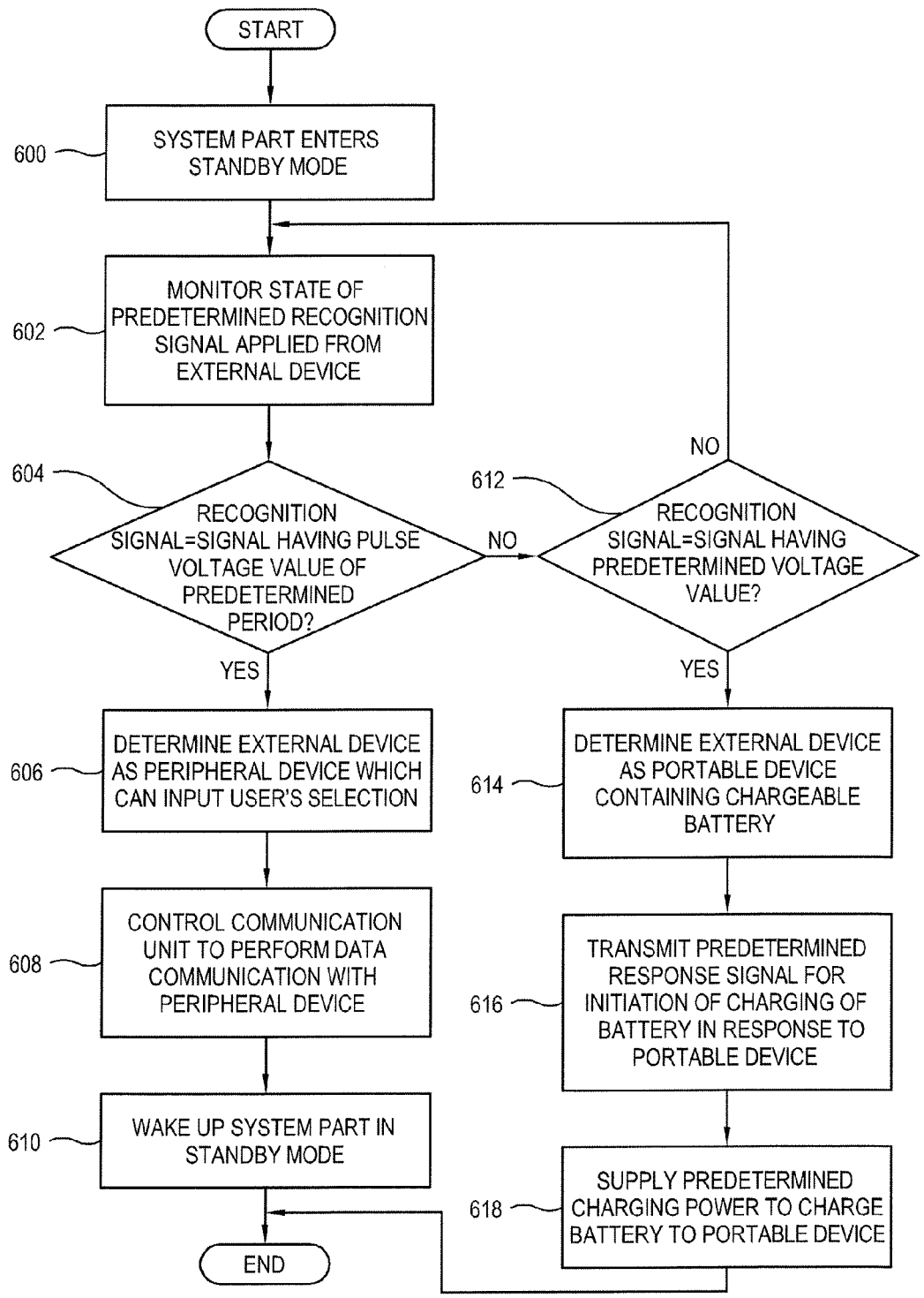
FIG. 7 is a flow chart of a control operation of a control unit of the computer system according to one exemplary embodiment of the present general inventive concept.

FIG. 7 is a flow chart of a control operation of the control unit of the computer system 1 according to an exemplary embodiment of the present general inventive concept.

The system part 10 enters from the operation mode into the standby mode (600). Even under the standby mode of the system part 10, power is made supplied to the control unit 40 and the connector 20.

The control unit 40 monitors a state of a predetermined recognition signal applied from the external device 100 connected to the connector 20 (602.

As a result of the monitoring, the control unit 40 checks whether or not the recognition signal is a pulse signal having a pulse voltage value of a predetermined period (604).

If it is determined that the recognition signal is the pulse signal having the pulse voltage value of the predetermined period, the control unit 40 determines the external device 100 as the user peripheral device 120 or the user external device which can input a selection from a user (606). Then, the control unit 40 controls the communication unit 30 to perform data communication with the peripheral device 120 (608). In addition, the control unit 40 wakes up the system part 10 from the standby mode, i.e., switches the control unit 40 from the standby mode to the operation mode (610).

If it is determined that the recognition signal is not the pulsed signal having the pulse voltage value of the predetermined period, the control unit 40 determines whether or not the recognition signal is a constant signal having a constant predetermined voltage value (612).

If it is determined that the recognition signal is the constant signal having the predetermined constant voltage value, the control unit 40 determines the external device 100 as the portable device 110 or the battery external device containing a chargeable battery (614). Then, the control unit 40 may transmit a predetermined response signal to initiate battery charging to the portable device 110 (616) or may control predetermined charging power to charge the battery to be supplied to the portable device 110 (618). Operations 616 and 618 may be selectively performed.

Although a few exemplary embodiments of the present general inventive concept have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. A computer system comprising:
   a system part to output at least one of a control signal and a data signal and a power signal;
   a connector to which an external device is connected;
   a communication unit which performs communication with the external device; and
   a control unit which is connected between the connector and the communication unit to monitor a state of a predetermined recognition signal applied from the external device when the system part is in a standby mode, and performs a predetermined function corresponding to the monitored state of the recognition signal,
   wherein the control unit determines whether the recognition signal is a pulse signal having a pulse voltage value of a predetermined period or a constant signal having a constant predetermined voltage value.

2. The computer system according to claim 1, wherein, if it is checked that the recognition signal is the signal having the pulse voltage value of the predetermined period, the control unit determines the external device as a user external device which can input a selection from a user and controls the communication unit to perform data communication with the external device.

3. The computer system according to claim 2, wherein the control unit switches the system part from the standby mode to an operation mode when the external device is determined as the user external device which can input the selection from the user.

4. The computer system according to claim 3, wherein the user external device which can input the selection from the user comprises a pointing device unit or a keyboard.

5. The computer system according to claim 1, wherein, if it is checked that the recognition signal is the constant signal having the constant predetermined voltage value, the control unit determines the external device as a battery external device containing a chargeable battery and transmits a predetermined response signal to initiate charging of the battery in response to the recognition signal to the battery external device.

6. The computer system according to claim 5, further comprising a power supply unit,
   wherein, when the external device is determined as the battery external device containing the chargeable battery, the control unit controls the power supply unit to supply predetermined charging power to charge the battery to the external device through the connector.

7. The computer system according to claim 1, further comprising a switching unit which selectively connects the connector to one of the communication unit and the control unit,
   wherein the control unit controls the switching unit to electrically connect the connector to the control unit when the system part is in the standby mode.

8. The computer system according to claim 7, wherein, if it is checked that the recognition signal is the pulse signal having the pulse voltage value of the predetermined period, the control unit controls the switching unit to electrically connect the connector to the communication unit.

9. The computer system according to claim 7, wherein, if it is checked that the recognition signal is the constant signal having the constant predetermined voltage value, the control unit controls the switching unit to electrically connect the connector to the control unit.

10. The computer system according to claim 9, wherein the switching unit further comprises an output signal circuit which outputs an output signal having a predetermined voltage value in response to the recognition signal.

11. The computer system according to claim 10, wherein the output signal circuit comprises one of a ground circuit, a pull-down circuit and a resistive voltage divider circuit.

12. The computer system according to claim 1, wherein the connector comprises a universal serial bus (USB) interface.

13. A control method of a computer system, comprising:
    initiating a system part into a standby mode;
    monitoring a state of a predetermined recognition signal applied from an external device by means of a control unit that is connected between a connector to which the external device is connected and a communication unit that communicates with the external device; and
    performing a predetermined function corresponding to the monitored state of the recognition signal,
    wherein the monitoring comprises checking whether the recognition signal is a pulse signal having a pulse voltage value of a predetermined period or a constant signal having a constant predetermined voltage value.

14. The control method according to claim 13, wherein, if it is checked in the monitoring that the recognition signal is the pulse signal having the pulse voltage value of the predetermined period, the performing a predetermined function comprises determining the external device as a user external device which can input a selection from a user and controlling the communication unit to perform data communication with the external device.

15. The control method according to claim 14, wherein the performing a predetermined function comprises switching the system part from the standby mode to an operation mode when the external device is determined as the user external device which can input the selection from the user.

16. The control method according to claim 15, wherein the user external device which can input the selection from the user comprises a pointing device unit or a keyboard.

17. The control method according to claim 13, wherein, if it is checked in the monitoring that the recognition signal is the constant signal having the constant predetermined voltage value, the performing a predetermined function comprises determining the external device as a battery external device containing a chargeable battery and transmitting a predetermined response signal to initiate charging of the battery in response to the recognition signal from the external device.

18. The control method according to claim 17, wherein, when the external device is determined as the battery external device containing the chargeable battery, the performing a predetermined function comprises controlling a power supply unit to supply predetermined charging power to charge the battery to the external device through the connector.

19. The control method according to claim 13, wherein the computer system further comprises a switching unit which selectively connects the connector to one of the communication unit and the control unit,
the control method further comprising controlling the switching unit to electrically connect the connector to the control unit by means of the control unit when the system part is in the standby mode.

20. The control method according to claim 19, wherein, if it is checked in the monitoring that the recognition signal is the pulse signal having the pulse voltage value of the predetermined period, the controlling the switching unit comprises controlling the switching unit to electrically connect the connector to the communication unit.

21. The control method according to claim 19, wherein, if it is checked in the monitoring that the recognition signal is the constant signal having the constant predetermined voltage value, the controlling the switching unit comprises controlling the switching unit to electrically connect the connector to the control unit.

22. The control method according to claim 21, wherein the switching unit further comprises an output signal circuit which outputs an output signal having a predetermined voltage value in response to the recognition signal.

23. The control method according to claim 22, wherein the output signal circuit comprises one of a ground circuit, a pull-down circuit and a resistive voltage divider circuit.

24. The control method according to claim 13, wherein the connector comprises a universal serial bus (USB) interface.

25. A computer system including a communication interface to receive an external device and including a system part operable in an operation mode and a standby mode, comprising:
a communication unit electrically connected to the communication interface to communicate with the external device; and
a control unit in electrical communication with the system part and the communication unit to detect the standby mode of the system part and to detect a recognition signal output by the external device and to perform at least one operation with the external device based on the recognition signal while the system part exists in the standby mode,
wherein the recognition signal indicates that the external device is one of a peripheral device or a battery powered device.

26. The computer system of claim 25, wherein the recognition signal is one of a pulse signal having a pulse voltage over a predetermined period or a constant signal having a constant predetermined voltage.

27. The computer system of claim 26, wherein the control unit determines that the external device is a peripheral device in response to detecting the pulse signal and determines that the external device is a battery powered device in response to detecting the constant signal.

28. The computer system of claim 25, further comprising:
a first power supply in electrical communication with the control module and including a first output connected to the communication unit and a second output connected to the communication interface and a third input connected to the system part.

29. The computer system of claim 28, wherein the control unit controls the first power supply to output power to the communication interface while inhibiting power to the system part when the external device is a battery powered device.

30. The computer system of claim 28, wherein the control unit controls the first power supply to output power to the communication unit while inhibiting power to the system part when the external device is a peripheral device to communicate data between the communication unit and the peripheral device.

31. The computer system of claim 30, wherein the control unit controls the first power supply to output power to the system part to switch the system part from the standby mode to the operation mode when the external device is a peripheral device.

32. The computer system of claim 25, further comprising:
a switching unit in electrical communication with the control unit and the communication unit and the communication interface; and
a second power supply in electrical communication with the switching unit and the communication interface to output a charging power.

33. The computer system of claim 32, wherein the control unit controls the switching unit to initiate the second power supply to output the charging power to the communication interface to charge a battery while controlling the switching unit to disconnect communication between the communication unit and the connection interface when the external device is a battery powered device.

34. The computer system of claim 32, wherein the second power supply includes two output signal circuits to generate the charging power.

35. The computer system of claim 34, wherein the two output signal circuits include at least one of a ground circuit, a pull-down circuit and a resistive voltage divider circuit.

* * * * *